United States Patent
Cave et al.

(10) Patent No.: US 7,454,205 B2
(45) Date of Patent: Nov. 18, 2008

(54) WIRELESS COMMUNICATION METHOD AND APPARATUS FOR IMPLEMENTING ACCESS POINT STARTUP AND INITIAL CHANNEL SELECTION PROCESSES

(75) Inventors: Christopher Cave, Candiac (CA); Angelo Cuffaro, Laval (CA); Paul Marinier, Brossard (CA); Teresa Joanne Hunkeler, Montreal (CA); Juan Carlos Zuniga, Montreal (CA); Vincent Roy, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 486 days.

(21) Appl. No.: 11/332,973

(22) Filed: Jan. 17, 2006

(65) Prior Publication Data
US 2006/0121929 A1 Jun. 8, 2006

Related U.S. Application Data (63) Continuation of application No. 10/978,956, filed on Nov. 1, 2004, now Pat. No. 7,016,684.

(60) Provisional application No. 60/535,073, filed on Jan. 8, 2004, provisional application No. 60/535,019, filed on Jan. 8, 2004, provisional application No. 60/526,134, filed on Dec. 1, 2003.

(51) Int. Cl.
*H04Q 7/20* (2006.01)
(52) U.S. Cl. ............ 455/434; 455/450
(58) Field of Classification Search .......... 455/450, 455/434
See application file for complete search history.

(56) References Cited

U.S. PATENT DOCUMENTS

| 5,963,848 | A | 10/1999 | D'Avello |
| 6,002,676 | A | 12/1999 | Fleming |
| 6,535,742 | B1 | 3/2003 | Jiang et al. |
| 6,941,140 | B2 * | 9/2005 | Tateson ............ 455/434 |
| 7,016,684 | B2 | 3/2006 | Cave et al. |
| 2003/0087645 | A1 | 5/2003 | Kim et al. |
| 2003/0181211 | A1 | 9/2003 | Razavilar et al. |
| 2003/0236064 | A1 | 12/2003 | Shiohara et al. |
| 2004/0039718 | A1 | 2/2004 | Lee et al. |
| 2004/0166870 | A1 | 8/2004 | Backes |
| 2005/0083962 | A1 * | 4/2005 | Khun-Jush et al. ......... 370/445 |
| 2005/0090250 | A1 | 4/2005 | Backes |
| 2006/0025150 | A1 | 2/2006 | Kim et al. |

FOREIGN PATENT DOCUMENTS

| EP | 1 206 070 | 5/2002 |
| WO | 03/081848 | 10/2003 |

\* cited by examiner

*Primary Examiner*—Vincent P. Harper
*Assistant Examiner*—Marivelisse Santiago
(74) *Attorney, Agent, or Firm*—Volpe and Koenig, P.C.

(57) ABSTRACT

A startup process of an access point (AP) includes a discovery phase and an announcement phase. During the discovery phase, the AP detects neighboring APs from its own extended service set (ESS), neighboring APs from different ESSs, and external sources of interference. During the announcement phase, the AP transmits its beacon signals at maximum power in order to accelerate recognition by neighboring APs running the discovery phase. An automatic initialization channel selection process of an AP scans channels the AP will use to communicate. Information of each scanned channel is recorded and a best performance channel is determined for use by the AP.

14 Claims, 4 Drawing Sheets

WIRELESS COMMUNICATION METHOD AND APPARATUS FOR IMPLEMENTING ACCESS POINT STARTUP AND INITIAL CHANNEL SELECTION PROCESSES

CROSS REFERENCE TO RELATED APPLICATION

This application is a continuation of U.S. patent application Ser. No. 10/978,956 filed Nov. 1, 2004, which claims the benefit of U.S. Provisional Application Nos. 60/526,134 filed on Dec. 1, 2003, 60/535,019 filed on Jan. 8, 2004, and 60/535,073 filed on Jan. 8, 2004, which are incorporated by reference as if fully set forth.

FIELD OF INVENTION

The present invention relates to a wireless communication system. More particularly, the present invention relates to initializing operating parameters and selecting the most appropriate operating channel for an access point (AP).

BACKGROUND

The conditions of a radio link under which a wireless communication system operates may change at any time. Since a wireless transmit/receive unit (WTRU) is mobile, the WTRU may be out-of-range, or within range of one or more APs depending upon the position of the WTRU. When an AP is newly established, or powers up again after powering down for some reason, the startup process of the AP must evaluate its radio resource environment. Typically, the startup process also provides a mechanism for announcing itself to other APs of its own extended service set (ESS) such that the other APs can self-adjust their own operating parameters accordingly.

There are several current schemes that are employed in order to increase the capacity of a wireless communication system. Channel, i.e., frequency, selection is one of such schemes, whereby one or more APs in a network select one or more channels to communicate with their associated WTRUs. Coordination of AP channel selection is usually performed manually. However, it is very impractical to manually coordinate channel selection in response to every small change in the network configuration since it may cause a redesign and reconfiguration of all APs. Unlicensed spectra and external sources of interference also raise problems that are not adequately addressed by manual coordination. Moreover, it is difficult for manual channel selection to assign channels such that the traffic loads of neighboring APs are shared among the available channels in a way that maximizes overall system capacity.

Another problem with prior art schemes is encountered when a multiple APs attempt to power:-up simultaneously. When this occurs within a network, all of the APs try to make a channel selection at the same time. Thus, the channel selection by the APs would not be optimal since each AP does not take into account the channel selection of neighboring APs.

A method and system which overcomes the above-mentioned problems would be greatly beneficial.

SUMMARY

The present invention provides a method and apparatus for implementing startup and initial channel selection processes for an AP.

The startup process of the AP includes a path loss discovery phase and an announcement phase. During the path loss discovery phase, the AP detects neighboring APs from its own ESS, neighboring APs from different ESSs, and external sources of interference. During the announcement phase, the AP transmits a beacon signal in order to accelerate recognition by neighboring APs also running the path loss discovery phase. The startup process provides the AP with the ability to monitor and evaluate its radio environment, and therefore allows the AP to self-determine initial operating parameters.

An initialization channel selection process for an AP is automatically implemented when the AP's startup process begins.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

Hereafter, the terminology "WTRU" includes but is not limited to a user equipment (UE), mobile station, fixed or mobile subscriber unit, pager, or any other type of device capable of operating in a wireless environment.

Hereinafter, the terminology "AP" includes but is not limited to an access point, a base station, Node-B, site controller, or any other type of interfacing device in a wireless environment.

The features of the present invention may be incorporated into an IC or be configured in a circuit comprising a multitude of interconnecting components.

The present invention as described herein, is generally applicable to wireless local area network (WLAN) technologies, as applied to the IEEE 802.11 and ETSI HyperLAN specifications in general, but is envisaged to be applicable to other interference-limited wireless systems such as IEEE 802.15 and IEEE 802.16.

Figure 1:
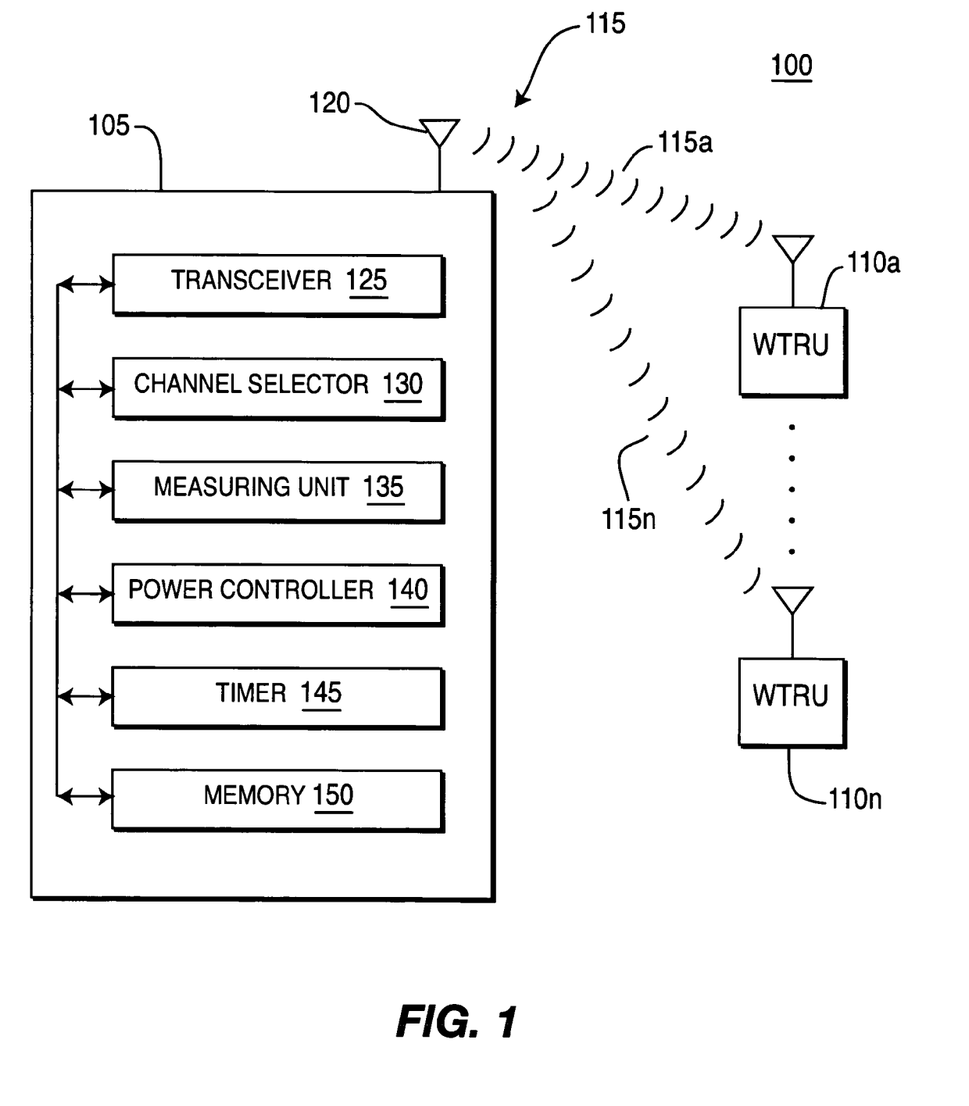
FIG. 1 is a block diagram of a wireless communication system in accordance with the present invention.

FIG. 1 is a block diagram of a wireless communication system 100 according to the present invention. The wireless communication system 100 comprises an AP 105 and a plurality of WTRUs 110*a*-110*n*. The AP 105 communicates with the WTRUs 110*a*-110*n* over a wireless link 115 via an antenna 120. The AP 105 includes a transceiver 125, a channel selector 130, a measuring unit 135, a power controller 140, a timer 145 and a memory 150. The transceiver 125 transmits signals 115*a*-115*n* to, and receives signals 115*a*-115*n* from, the WTRUs 110*a*-110*n* via the antenna 120.

The channel selector 130 selects a channel which is used for communication with each WTRU 110*a*-110*n*. The measuring unit 135 measures operating parameters for supporting the AP 105. The measuring unit 135 is responsible for collecting, processing and storing channel measurements including, but not limited to: the channel utilization (i.e. percentage of time that the channel is busy), the level of external (non 802.11) interference, the received signal strength measured on received packets, and the like. The power controller 140 controls the transmission power of the AP 105. The timer 145 sets one or more predetermined periods during which the AP 105 performs certain operations. The memory 150 provides storage for the AP 105, including recording data such as results of the measurements.

Figure 2:
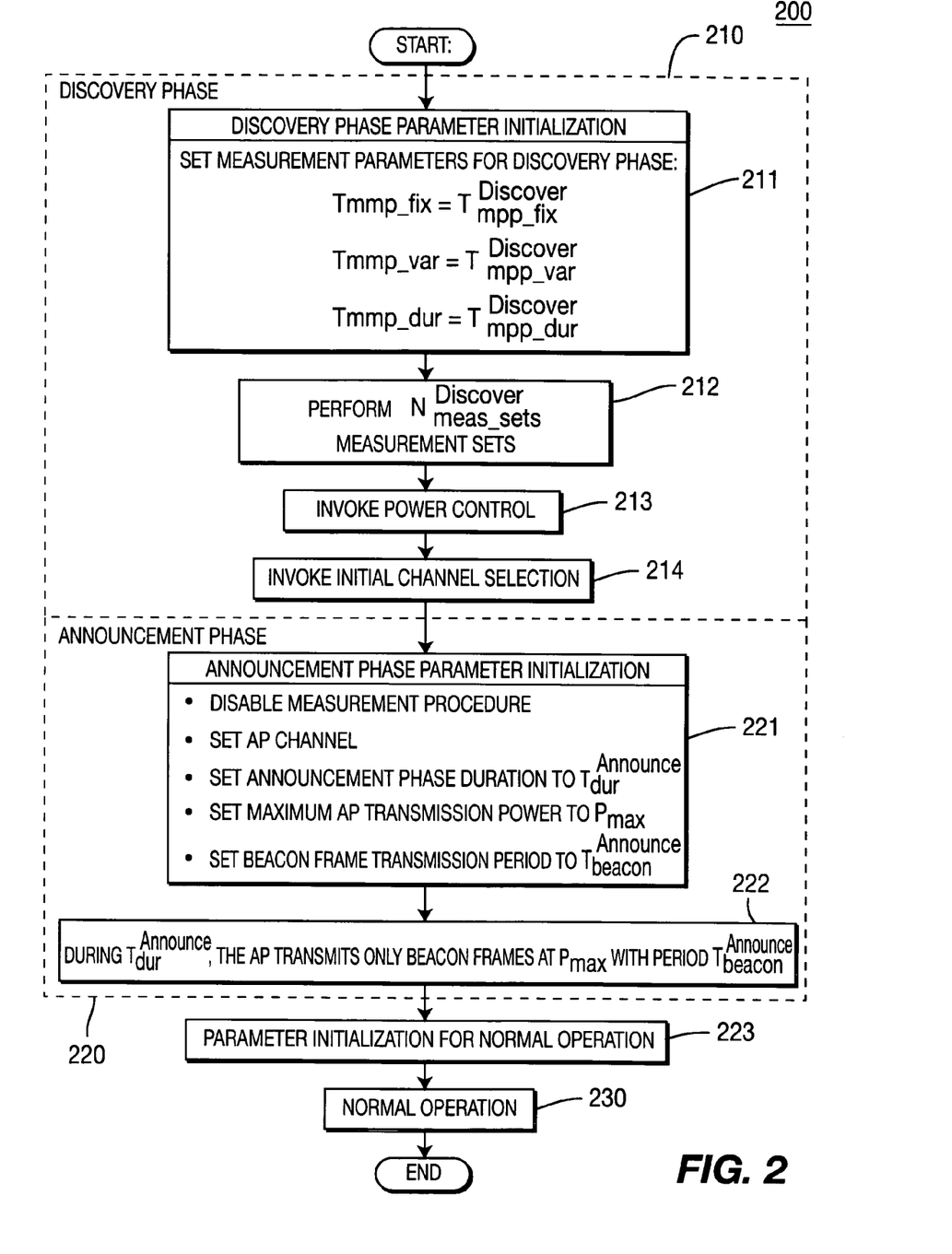
FIG. 2 is a flow diagram of a startup process of an AP according to one embodiment of the present invention.

FIG. 2 is a flow diagram of a startup process 200 of the AP 105 including a discovery phase 210 and an announcement phase 220. In the discovery phase 210, the AP 105 initializes its measurement parameters and values (step 211). The measurement parameters and values that are initialized may, for example, include the parameters and values listed in the following Table 1. As those of skill in the art would realize, other parameters and values may be used, in addition to, or in place of, these parameters and values.

TABLE 1

| Symbol | Description | Type | Default value |
|---|---|---|---|
| ACS | Allowable Channel Set | Configuration parameter | {1, 6, 11} |
| $T_{mpp\_fix}^{Discover}$ | Discovery phase value of the fixed component of the Silent Measurement Period generation interval | Configuration parameter | 1000 ms |
| $T_{mpp\_var}^{Discover}$ | Discovery phase value of the amplitude of the variable component of the Silent Measurement Period generation interval | Configuration parameter | 0 ms |
| $T_{mpp\_dur}^{Discover}$ | Discovery phase value of the duration of a Silent Measurement Period | Configuration parameter | 1000 ms |
| $N_{MIN\_MS}^{Discover}$ | Minimum number of measurement sets during the Discovery Phase | Configuration parameter | 4 |
| $N_{MAX\_MS}^{Discover}$ | Maximum number of measurement sets during the Discovery phase | Configuration parameter | 15 |
| $T_{dur}^{Announce}$ | Announcement phase duration | Configuration parameter | 10 seconds |
| $T_{beacon}^{Announce}$ | Beacon transmission period during Announcement phase. | Configuration parameter | 100 ms |
| $P_{Max}$ | Maximum AP transmission power | Configuration parameter | 20 dBm |

In step 212 of the discovery phase 210, the measuring unit 135 measures the operating parameters by performing $N_{meas\_sets}^{Discover}$ measurement sets, whereby measurements are taken sequentially on each channel in an allowable channel set (ACS) for a period of time during a measurement set which consists of a complete cycle of measurement periods through all channels in the ACS. The operating parameters, for example, may be the transmission power and the channel setting of the AP 105. It is preferable that the overall measurement duration on each channel, which corresponds to $T_{mpp\_fix}^{Discover} \times N^{Discover}$, is set such that enough loud packets are received from neighboring APs. The loud packets are the packets that are sent at maximum power by an AP to increase the likelihood of its being detected by its neighboring APs.

The duration of $T_{mpp\_fix}^{Discover}$ is set such that it is long enough to limit edge effects, which occur when a packet is in transmission during transition between measurement periods (MPs). It is also preferable for the $T_{mpp\_fix}^{Discover}$ to be set to a duration short enough to allow continuous cycling between frequencies so that the AP 105 can detect a channel change by one of its neighbors. The duration and periods are determined by the timer 145. The duration of the discovery phase 210 consists of a random number of measurement sets, uniformly distributed between $N_{MIN\_MS}^{Discover}$ and $N_{MAX\_MS}^{Discover}$. The duration of the discovery phase 210 is random to account for the case where two or more APs are powered-up simultaneously, avoiding that initial frequency selection be performed at the same time for these APs.

As a result of these measurements, the AP 105 can determine its radio environment, such as a detection of neighboring APs from its own ESS, a detection of neighboring APs from different ESSs, and a detection of external sources of interference.

Referring back to FIG. 2, once the $N_{meas\_sets}^{Discover}$ performance measurement sets have been completed (step 212), the power controller 140 invokes power control for the AP 105 (step 213). The power control determines a baseline range of the AP 105 and a related baseline power setting. After the power control of the AP 105 is invoked at step 213, the channel selector 130 invokes a channel optimization process (step 214) to select channels that a particular AP or network of APs use. The initial channel setting of the AP 105 is determined based on parameters that are determined by the power controller 140.

During the discovery phase 210, the AP 105 remains silent, (i.e., the AP 105 does not transmit any packets). Upon completion of the discovery phase 210, the AP 105 has gathered enough information to determine an optimal operating channel and select a transmission power setting.

After the discovery phase 210 ends, an announcement phase 220 follows. During the announcement phase 220, the AP configures its operating channel to the optimal channel determined at the end of the discovery phase 210. It should be noted that other processes may be performed in the interim as necessary. The purpose of the announcement phase 220 is to accelerate the detection of the AP by its neighboring APs. In the beginning of the announcement phase 220, various parameters, (e.g., $T_{dur}^{Announce}$, $T_{beacon}^{Announce}$, $P_{Max}$), and are initialized (step 221). During the announcement phase duration $T_{dur}^{Announce}$ the AP 105 only transmits beacon frames having a maximum transmission power $P_{Max}$ with period $T_{beacon}^{Announce}$ (step 222). This accelerates the detection of the AP 105 by other APs, because only maximum power packets are transmitted. During the announcement phase 220, WTRUs beyond the coverage range of the AP 105 may attempt to associate with the AP 105, because the AP 105 is transmitting at its maximum power $P_{Max}$. For this reason, all association requests from WTRUs are denied during the announcement phase 220 in order to avoid associating a WTRU that will be out of range during normal operation.

Once the announcement phase 220 ends, the startup of the AP 105 is complete. The AP 105 then configures itself for its normal operation (step 223) and begins normal operation (step 230). The AP 105 sets its transmission power to the setting determined by the power controller 140, after which the AP 105 begins normal operation and starts accepting association requests from the WTRUs 110.

Figure 3:
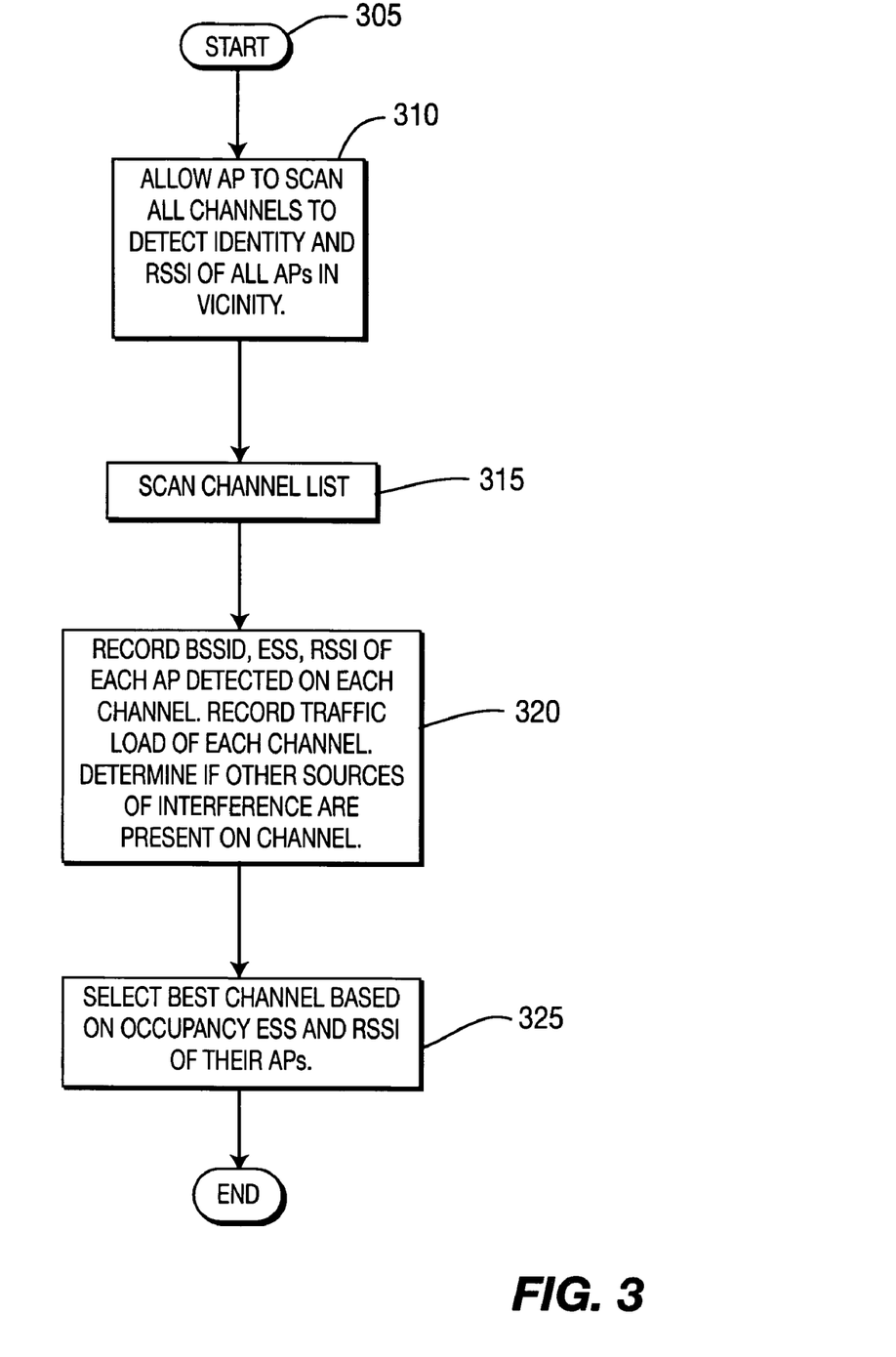
FIG. 3 is a flow diagram of an automatic channel selection process according to another embodiment of the present invention.

FIG. 3 is a flow diagram of an automatic initialization channel selection process 300 according to one embodiment of the present invention. In the preferred embodiment, the channel selection process is invoked at the end of the discovery phase 210, where measurements on each channel have been taken. Channels are chosen for use by a particular AP, or a network of APs. Channel selection can be done either manually or automatically, and can be initiated at deployment or performed dynamically during operation. The present invention may be implemented in conjunction with wireless local area network (WLAN) applications, e.g., in accordance with IEEE 802.11.

The initialization channel selection process 300 is performed during the startup process 200 and determines the best operation channel. In the preferred embodiment, channels are being scanned during the discovery phase 210. At the end of the discovery phase 210, the channels selection process is invoked in step 214 to select the best channel based on the measurements observed on each channel during the discovery phase 210. In all cases, the initialization channel selection process 300 scans a plurality of channels (e.g., channels 1-11) to detect the best channel available. The sequence of scanned channels may be in a predetermined order, or it may be random. The channel sequence does not need to include all available channels. For each channel scanned, the process determines: 1) what other APs are operating on that channel; 2) whether the APs are part of the same system, (i.e., according to the ESS); 3) the signal strength of the APs; 4) the amount of traffic on the channel; and 5) if there are any other sources of interference on the channel, (e.g., non-802.11 interference), and the received power level on non-WLAN interference. After the scanning is complete, the AP can calculate which channel would give the best performance, (e.g., the channel that has the least amount of interference). The AP then retunes itself to that channel. Depending on whether the other APs detected are part of the same system, the AP can decide to be more or less aggressive in the choice of channel to use.

In an alternate embodiment, coordinated frequency selection may be accomplished by: 1) having APs exchange information with each other about their properties (e.g. load, capabilities or position); or 2) having a centralized scheme that can obtain information from each AP, and setting the channel of all APs in the network. For the first case, the decision is still made autonomously by each AP, but the information exchanged can allow a better decision (e.g. it can include statistics that are difficult to observe externally by another AP). For the second case, information is gathered from the different APs and communicated to a centralized unit or device, which upon reception of the information takes a decision and communicates the decision back to the different APs.

Referring still to FIG. 3, when the initialization channel selection process 300 is initiated (step 305), the AP 105 is allowed to scan all channels to detect the identity and a received signal strength indicator (RSSI) of all APs in the vicinity (step 310). In the preferred embodiment, step 310 may be implemented during the discovery phase 210. In step 315, the channel list is scanned. All, or a portion, of the listed channels may be sequentially scanned in a predetermined or random order. Information associated with each AP detected on each channel is recorded (step 320). This information may include, but is not limited to, the identity of other APs which are operating on the scanned channel, an indication of whether other APs are part of the same ESS, the signal strength of the APs, the amount of traffic on the channel and whether there are any other sources of interference on the channel.

After the scanning is complete, the AP 105 determines which channel provides the best performance (step 325). This may be determined, for example, by measuring which channel has the least amount of interference or whether other APs are part of the same ESS. Once the channel having the best performance is determined, the AP 105 tunes itself to the best channel.

Figure 4:
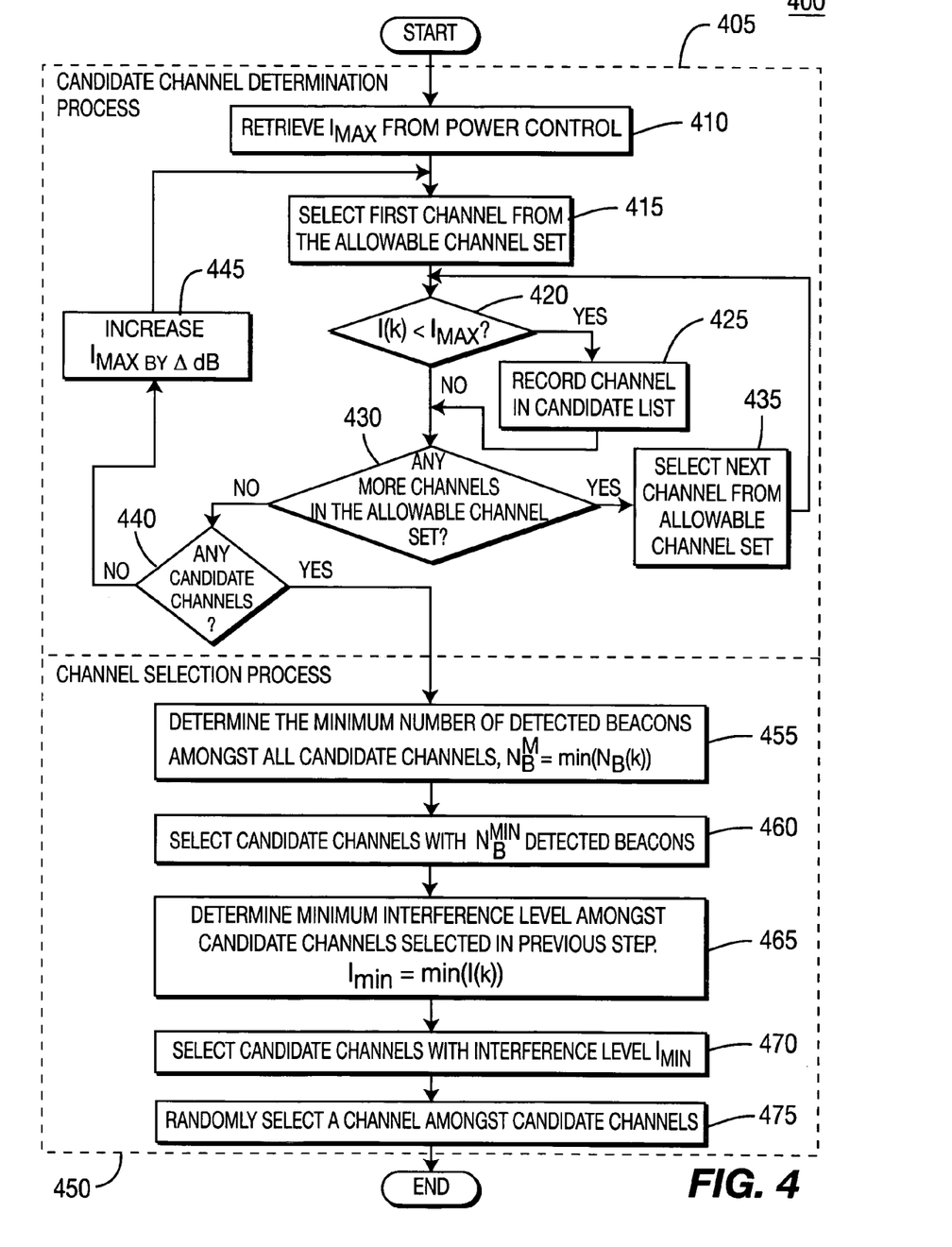
FIG. 4 is a flow diagram of an initialization channel selection process in accordance with yet another embodiment of the present invention.

FIG. 4 is a detailed flow diagram of an initialization channel selection process 400 used to determine the best channel upon AP startup according to another embodiment of the present invention. The initialization channel selection process 400 includes a candidate channel determination process 405 and a channel selection process 450.

In the candidate channel determination process 405, the AP 105 retrieves the maximum allowed interference $I_{MAX}$ (step 420), which is the maximum allowed interference on any given channel determined based on the baseline range of an AP. $I_{MAX}$ may be obtained from the power control process. Imax is calculated by the initialization channel selection process 400 using Equation (1) below. Some of the parameters that are used in Equation (1) are retrieved from the power control process. Specifically, power control will determine RNGbase. Pmax, (C/I)req_hig and MI on the other hand are pre-determined parameters. Preferably, $I_{MAX}$ for the candidate channel determination process 405 is calculated based on Equation (1) as follows:

$$I_{MAX} = P_{MAX} - RNG_{base} - (C/I)_{req\_high} - M_I; \quad \text{Equation (1)}$$

where $P_{MAX}$ is the maximum transmission power of the AP 105; $RNG_{base}$ is the range covered by the AP 105; and $(C/I)_{req\_high}$ is the required carrier power-to-interference ratio of a high rate packet, (for example 11 Mbps). $M_I$ is a margin to eliminate channels with interference levels too close to the actual maximum allowed level. Alternatively, a pre-determined value of Imax can be $I_{MAX}$ used to determined the list of candidate channels.

A first channel is selected from an ACS (step 415). Interference I of a channel is measured and compared with the maximum allowed interference $I_{MAX}$ (step 420). If the interference I of the channel is less than the maximum allowed interference $I_{MAX}$, the AP 105 records the channel in a candidate list in the memory 150 (step 425). If the interference I of the channel is not less than the maximum allowed interference $I_{MAX}$, the AP 105 checks whether any more channels in the ACS exists (step 430). If more channels in the ACS exist, the AP 105 selects next channel from the ACS (step 435) and the candidate channel determination process 405 then returns to step 420.

If no more channels exist in the ACS, the AP 105 checks whether any candidate channel is available (step 440). If, in step 440, it is determined that no candidate channel is available, the AP 105 increases $I_{MAX}$ by ΔdB (step 445) and the candidate channel determination process 405 returns to step 415. If, in step 440, it is determined that at least one candidate channel exists, the candidate channel determination process 405 is complete and the channel selection process 450 is then performed.

One criterion used by the channel selection process 450 is the number of neighboring BSSs that have been detected on each channel $N_B(k)$. Once the candidate channels are selected, the minimum number of detected beacons from different BSSs, among all candidate channels, $N_B^{MIN}$ is determined (step 455). The number of neighboring BSSs that have been detected on channel k, $N_B(k)$, with the minimum number of detected BSSs, $N_B^{MIN}$, and all channels for which $N_B(k) > N_B^{MIN}$ are removed from the list of candidate channels (step 460). In other words, only the channels with the minimum number of detected BSSs are retained. Alternatively, in steps 455 and 460, the number of detected neighbor BSSs on each channel could be replaced with the channel utilization on each channel. The channel utilization measurement corresponds to the percentage of time that the receiver is carrier locked by a WLAN signal. In this case, the channel selection process would favor channels that have lower channel utilization.

Another criterion used by the channel selection process is the minimum measured interference level, which is determined among all remaining candidate channels (step 465). The minimum measured interference level on channel k I(k) and the minimum interference level $I_{MIN}$ are compared, and all channels for which $I(k) > I_{MIN}$ from the list of candidate channels are removed (step 470). In other words, only the channels with the minimum interference level are retained.

If more than one candidate channel with the minimum interference level exists, a channel is randomly selected among the remaining candidate channels (step 475).

Exemplary parameters of the initialization channel selection process 400 are listed in the following Table 2. As those of skill in the art would realize, other parameters and values may be used in addition, or in place of, these values.

TABLE 2

| Symbol | Description | Type | Default Value |
|---|---|---|---|
| ACS | Allowable channel set. | Configuration parameter | {1, 6, 11} |
| $N_B(k)$ | The number of neighboring BSSs detected on channel k. The minimum value of EDT is used to detect neighboring beacon frames. | Measurement | NA |
| I(k) | The interference measured on channel k. I is measured as the average received signal power in the absence of "carrier lock" by the receiver (i.e. the receiver is not receiving any packets). | Measurement | NA |
| $RNG_{base}$ | Baseline Range (set by the Path Loss Discovery process) | Internal parameter | NA |
| $(C/I)_{req}$ | Minimum required carrier power to interference ratio to support maximum data rate. | Configuration parameter | 10 dB |
| $P_{MAX}$ | Maximum AP transmission power | Configuration parameter | 20 dbm |
| $I_{MAX}$ | The maximum allowed interference on any given channel determined based on baseline range. | Internal parameter | NA |
| $M_I$ | Interference margin used in the calculation of the maximum allowable interference level, $I_{MAX}$ | Configuration parameter | 3 dB |
| Δ | The amount, in dB, by which the maximum allowed interference, $I_{MAX}$, is increased if there are no candidate channels for which $I < I_{MAX}$. | Configuration Parameter | 3 dB |

Although the features and elements of the present invention are described in the preferred embodiments in particular combinations, each feature or element can be used alone or in various combinations with or without other features and elements of the present invention.

What is claimed is:

1. A wireless communication method of performing a startup process of an access point (AP), the method comprising:
    performing a discovery phase including:
        initializing a plurality of measurement parameters and values;
        measuring a plurality of operating parameters by performing N measurement sets, wherein measurements are taken sequentially on each channel in an allowable channel set (ACS) for a period of time;
        invoking power control for the AP; and
        invoking initial channel selection to determine an optimal channel; and
    performing an announcement phase after the discovery phase ends, the announcement phase including:
        the AP configuring its operating channel to the optimal channel; and
        accelerating the detection of the AP by neighboring APs, wherein the AP only transmits beacon frames having a maximum AP transmission power and a beacon transmission period, and the AP denies any association requests received from a plurality of wireless transmit/receive units (WTRUs) during the announcement phase.

2. The method of claim 1 wherein after the startup process is complete, the AP configures itself for normal operation and starts accepting association requests from the WTRUs.

3. The method of claim 1 wherein the beacon transmission period is 100 ms.

4. The method of claim 1 wherein the maximum AP transmission power is 20 dBm.

5. The method of claim 1 wherein the announcement phase has a duration of 10 seconds.

6. The method of claim 1 wherein the discovery phase has a random duration.

7. The method of claim 1 wherein N ranges from a minimum of 4 to a maximum of 15.

8. An access point (AP) for performing a startup process including a discovery phase and an announcement phase, the AP comprising:
    a timer;
    a measuring unit configured to measure a plurality of operating parameters by performing N measurement sets during the discovery phase, wherein measurements are taken sequentially on each channel in an allowable channel set (ACS) for a period of time defined by the timer; and
    a transceiver configured to accelerate the detection of the AP by neighboring APs during the announcement phase by only transmitting beacon frames having a maximum AP transmission power and a beacon transmission period, and denying any association requests received from a plurality of wireless transmit/receive units (WTRUs) during the announcement phase.

9. The AP of claim 8 wherein after the startup process is complete, the transceiver configures itself for normal operation and starts accepting association requests from the WTRUs.

10. The AP of claim 8 wherein the beacon transmission period is 100 ms.

11. The AP of claim 8 wherein the maximum AP transmission power is 20 dBm.

12. The AP of claim 8 wherein the announcement phase has a duration of 10 seconds.

13. The AP of claim 8 wherein the discovery phase has a random duration.

14. The AP of claim 8 wherein N ranges from a minimum of 4 to a maximum of 15.

* * * * *

UNITED STATES PATENT AND TRADEMARK OFFICE
CERTIFICATE OF CORRECTION

PATENT NO.        : 7,454,205 B2
APPLICATION NO.   : 11/332973
DATED             : November 18, 2008
INVENTOR(S)       : Cave et al.

It is certified that error appears in the above-identified patent and that said Letters Patent is hereby corrected as shown below:

At column 1, line 53, after the word "when" delete "a".

At column 1, line 53, after the words "attempt to" delete "power:-up" and insert therefor --power-up--.

At column 4, line 54, before the words "(step 222)." delete "$T^{beaconAnnounce}$" and insert therefor --$T_{beacon}^{Announce}$--.

At column 6, line 26, before the words "on the" delete "RNGbase, Pmax, (C/I)req_hig and MI" and insert therefor --$RNG_{base}$, $P_{max}$, $(C/I)_{req\_high}$ and $M_I$--.

At column 7, Table 2, column 1, after line beginning with "$P_{MAX}$" delete "v".

Signed and Sealed this

Seventeenth Day of March, 2009

JOHN DOLL
*Acting Director of the United States Patent and Trademark Office*